United States Patent [19]
Matsubara et al.

[11] Patent Number: 5,481,791
[45] Date of Patent: Jan. 9, 1996

[54] METHOD OF MAKING A FLOATING-TYPE COMPOSITE MAGNETIC HEAD PROVIDED WITH A MAGNETIC CORE HAVING CONCAVE MARK(S) ON SIDE SURFACE THEREOF

[75] Inventors: Toshinori Matsubara; Toshiyuki Baba; Yasuo Kuriyama, all of Mooka, Japan

[73] Assignee: Hitachi Metals, Ltd., Tokyo, Japan

[21] Appl. No.: 150,828

[22] Filed: Nov. 12, 1993

[30] Foreign Application Priority Data

Nov. 13, 1992 [JP] Japan ................................ 4-303340
Jun. 18, 1993 [JP] Japan ................................ 5-147537

[51] Int. Cl.⁶ .................................................. G11B 5/42
[52] U.S. Cl. .................................................. 29/603; 29/407
[58] Field of Search ............... 29/603, 407; 360/119; 51/281 R, 323

[56] References Cited

U.S. PATENT DOCUMENTS 3,922,776  12/1975  Alger et al. ............................ 29/603
3,982,318   9/1976  Hennenfent et al. ................... 29/603
4,729,161   3/1988  Verbunt et al. ........................ 29/603

FOREIGN PATENT DOCUMENTS 2-49212   2/1990  Japan .
2-121105  5/1990  Japan .

*Primary Examiner*—Carl E. Hall
*Attorney, Agent, or Firm*—Staas & Halsey

[57] ABSTRACT

A magnetic core provided with one or more concave mark(s) with a depth of 2 um or less on at least one side surface of the magnetic core for a floating-type complex magnetic head, wherein the magnetic gap depth is controlled by machining the air bearing while observing a specific portion, from the direction perpendicular to the air bearing, of a concave mark or observing the level difference of specific portions of multiple concave marks provided on the side surface of the magnetic core in relation to the position of the apex of the magnetic core after cementing the magnetic core using glass filler inside a slit provided in the air bearing of a slider.

6 Claims, 6 Drawing Sheets

METHOD OF MAKING A FLOATING-TYPE COMPOSITE MAGNETIC HEAD PROVIDED WITH A MAGNETIC CORE HAVING CONCAVE MARK(S) ON SIDE SURFACE THEREOF

BACKGROUND OF THE INVENTION

1. Field of the Invention

This invention relates to a floating-type composite magnetic head and the production method thereof, more particularly, to a magnetic head wherein the magnetic gap depth is precisely controlled by inserting and molding a magnetic core provided with concave marks on its side surface into a slit provided in a slider.

2. Related Art

FIG. 4 shows an example of a magnetic core being used in a floating-type composite magnetic head. The magnetic core 41 comprises a C-shaped core 42 and an I-shaped core 43 joined together and bonded over a gap spacer so that a magnetic gap 44 is formed between them. The C-shaped core 42 and I-shaped core 43 are usually made of such materials as, for example, single crystal ferrite and, recently, in order to meet increasing requirements for high density storage, it is usual to apply a high-permeability magnetic film such as Fe—Al—Si alloy film on the surfaces facing the magnetic gap of either one or both of the cores.

With the example as per FIG. 4, said high permeability magnetic films 45 and 46 are applied to both the C-shaped core and I-shaped core. In FIG. 4, numeral 47 represents the depth of the magnetic gap 44, or the distance between the magnetic core surface facing the storage medium and the apex (the point on the C-shaped core where the plane forming the magnetic gap intersects with the inclined plane, whereby the gap distance by the plane, formed between the C-shaped and I-shaped cores remains the same and whereby the gap distance by the inclined plane gradually increases, and the point is indicated by a point or line in the drawing). The dimensional preciseness of the depth of the magnetic gap has a significant influence on the reading and reproducing characteristics.

Consequently, strict control of the apex position is very important in the production of these magnetic heads. Meanwhile, numeral 48 stands for reinforcing glass which fills the space between the C-shaped core 42 and I-shaped core 43 to firmly join the cores together, the filler extending all the way to the end of the coil winding clearance 49.

FIG. 5 is a schematic diagram showing an example of the structure of a floating-type composite magnetic head. The slider 52 of this floating-type composite magnetic head 51 is equipped with air bearings 53a and 53b to float on the magnetic disc (omitted from the drawing) functioning as the magnetic storage medium at both ends of its plane which faces the magnetic disc, air bearing 53a of the air bearings being equipped with a slit 54. The slit 54 is usually provided on the trailing side off the storage medium (which can be referred to as the air outlet side). A magnetic core 55 is inserted into the slit 54 and molded using glass filler 56. Numeral 57 represents a slot which is formed so that the coil winding clearance 58 maintained after molding the magnetic core 55.

A floating-type composite magnetic head of the structure is being produced under, for example, the method given below. FIG. 6 is an elevation of a floating-type composite magnetic head viewed from the slotted end. The exemplified production method includes inserting the magnetic core 61 into the slit 64 and placing a glass rod over the air-bearing side of the slit before heating the glass rod to melt it under a vacuum atmosphere or an ambient atmosphere of argon (Ar) or nitrogen ($N_2$), thus filling the space between the slit 64 and magnetic core 61 with glass filler 65 which molds the magnetic core 61.

After molding the magnetic core in the above-mentioned manner, excess glass filler is removed and the air-bearings 62a and 62b are subjected to a finishing process to obtain the required depth of the magnetic gap to complete a floating-type composite magnetic head.

When applying the finishing process to the air bearings, the magnetic gap depth has thus been controlled by observing and measuring the apex using an optical microscope and a micro-measurement scale, etc. installed to the eyepiece section. When doing this, since the magnetic core is buried under the glass filler for molding inside the slit as aforementioned it is impossible to directly view the apex of the magnetic gap from the direction perpendicular to the side surface of the magnetic core (for example, the direction of arrow A in FIG. 6). Consequently, the apex is measured by observing it from an inclined direction (for example, the direction of arrow B in FIG. 6) across the glass filler by tilting the magnetic head or the optical microscope.

Nevertheless, in the aforementioned method, since the focal distances to different points along the ridge of the magnetic core differ and the image of the edge line of the magnetic core appears indistinct owing to the inclined observation, it becomes necessary to maintain a larger distance between the objective lens and the magnetic head to obtain a clearer view which in turn limits the task to highly skilled workers because of the restriction to the use of higher magnification. Also, with the aforementioned method wherein inclined measurement is carried out across the glass filler, the measurement reading of the magnetic gap depth may be smaller than the actual dimension owing to the fact that the refractive index of glass is larger than that of air, and scratches applied to the surface of the glass filler while processing the air bearings interfere with the precise measurement of the apex point, thus making it extremely difficult to initiate commercial mass production under high precision control of the gap depth. Furthermore, when a housing made of ferrite is employed, the dark coloring of the housing hinders a view of the gap depth.

One possible solution to this problem is to provide a mark on the magnetic core which can be used as a reference for the magnetic gap depth and to measure the mark to determine the magnetic gap depth indirectly rather than by performing direct measurement of the magnetic gap depth (in other words, the apex position).

This method is already a known production method of thin-film magnetic heads wherein, for example, a triangular-pattern mark 91 in FIG. 9 whose width varies in the direction of the magnetic gap depth having one of its apexes positioned level with the apex of the magnetic gap and a rectangular-pattern mark 92 having one of its sides positioned level with the apex of the magnetic gap are applied by a thin-film forming process. When grinding the air bearing, the width of the triangular pattern $x_2$ is measured and is then compensated on the basis of the measurement result of the rectangular pattern width $x_4$ thus making an indirect measurement of the magnetic gap depth $x_3$. (Refer to Japanese Patent Laid-Open No. 49212/1990.)

Nevertheless, marks are applied by the thin-film forming process peculiar to thin-film magnetic heads, whereas floating-type composite magnetic heads which do not include the thin-film forming process in their production, are not at all applicable to this method.

To solve this problem, Japanese Patent Laid-Open No. 121105/1990 suggests measuring the magnetic gap depth using reference marks on a floating-type composite magnetic head by a marking method entirely different from that for the thin-film magnetic heads.

FIGS. 7 and 8 illustrate the said suggestion. To form the magnetic core block 71 first, preparing a pair of ferrite wafers 73 and 74, their contact planes 73a and 74a are mirror-finished. On said contact planes 73a and 74a, preprocessing grooves 73b and 74b are provided at a fixed pitch P. Further, on the contact plane 74a of the second wafer 74, a coil winding clearance groove 72 is provided in the direction perpendicular to the preprocessing grooves 74b, 74b . . . and on the contact plane 73a and the opposite surface of the first wafer 73, a glass filler groove 76 and notch groove 75 are provided respectively in the direction perpendicular to the preprocessing grooves 73b, 73b, . . . . Subsequently, gap spacer layers made of a material such as $SiO_2$ are applied to respective contact planes 73a and 74a by deposition before joining the contact planes of first and second wafers 73 and 74. Then, glass rods 79, 78 and 77 are inserted into the preprocessing grooves 73b and 74b, glass filler groove 76 and notch groove 75, respectively, before heating and melting said glass rods to fix the first and second wafers 73 and 74 by molding the preprocessing grooves 73b and 74b and the glass filler groove 76, and to fill the notch groove 75 with glass filler.

The molded block thus formed is then cut along the dotted lines as given in FIG. 7 and the cut-out blank is then kerf-machined to form the disc facing part of track width t to complete the core block. The core block is further sliced to form magnetic core 81 of the structure indicated in FIG. 8. Meanwhile, the magnetic gap 84 is formed along the contact planes of the first and second wafers across the disc facing part.

Magnetic core 81 thus obtained is provided with a measuring mark 85 at a prescribed position, corresponding to the apex, on its exposing external side 83. After the core is inserted and cemented in the slit, indirect measurement of the magnetic gap depth can be accomplished by measuring the mark which can be viewed directly from outside.

In recent years, demands for high density storage have been increasing and, simultaneously, the magnetic gap depth of floating-type composite magnetic heads is becoming smaller and smaller thus requiring stricter dimensional precision in relation to nominal dimensions.

Under such situation, with the aforementioned method whereby the mark is machined onto the exposed external side of the core, issues hitherto neglected are being highlighted, such as the positional accuracy of machining being difficult to obtain because the distance between the apex point and the mark is comparatively large, or only a slight incline of the magnetic core cemented in the slit resulting in a serious error.

Furthermore, since the mark is made on the core block before slicing into magnetic cores, it is comparatively difficult to place the mark at the position which accurately corresponds to the apex with all the magnetic cores thus produced owing to dislocation occurring when cemented, thus making it necessary to measure the position of the apex and the mark with each magnetic core before grinding the air bearings on the basis of the respective measurement results. Therefore, it is necessary to classify magnetic cores according to grinding amount, making mass-production difficult.

SUMMARY OF THE INVENTION

The present invention intends to solve the problems with conventional techniques and, concerning floating-type composite magnetic heads which are constructed by molding a magnetic core inside the slit provided in the air bearing using glass filler, intends to provide a floating-type composite magnetic head equipped with at least one concave mark for reading the magnetic gap depth on the side surface of the disc facing plane of a magnetic core.

This invention also intends to provide a production method of a floating-type composite magnetic head where the magnetic gap depth of the magnetic core cemented in the slider slit can be precisely controlled.

This invention further intends to provide a floating-type composite magnetic head where the influence of inclination of the magnetic core cemented inside the slit can be substantially minimized.

To obtain the floating-type composite magnetic head of this invention, it is necessary to use a magnetic head core having a concave mark at a particular position relative to the apex position on the side surface.

Also, the floating-type composite magnetic head of this invention can be produced by a production method wherein the concave mark is applied in advance to the side surface of the magnetic core and said magnetic core is inserted into a slit provided in the air bearing of the slider and molded by glass filler before finish-machining the air bearings to control the magnetic gap depth while observing the condition of said concave mark appearing on the disc facing plane of the magnetic core.

The production method of this invention has the feature that finishing can be carried out while observing the concave mark, provided on the side surface of the magnetic core which is molded inside the slit provided in the air bearing of the slider, from the direction perpendicular to the air bearing. Also with this invention, either one or multiple marks can be used to reference the apex when performing finish-machining while observing said multiple concave marks to control the magnetic gap depth. In this case, respective shapes, dimensions and relative locations of the multiple marks are selected in accordance with the required level of dimensional precision.

The concave marks can be applied by one of several well-known methods which include ion-milling, machining, chemical etching and laser beam processing. Of these methods, the laser beam marking method which does not damage the magnetic core and is capable of high-precision mark application can be suggested as a suitable method for the purpose of providing marks under this invention.

DETAILED DESCRIPTION OF THE PREFERRED EMBODIMENTS

The exemplary embodiments shall now be referred to more particularly as follows. This invention meanwhile shall not be limited to the exemplary embodiments described below.

Figure 10:
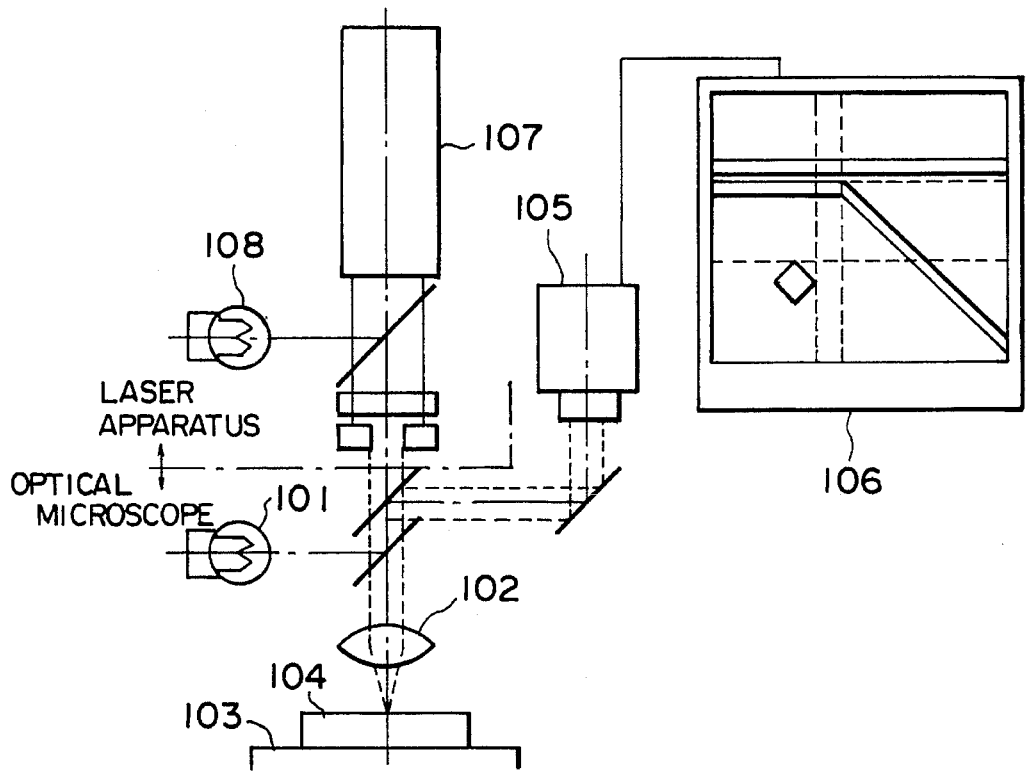
FIG. 10 is a drawing showing the structure of marking equipment.

With all the embodiments given below, marks are applied by laser beam processing, and the schematic drawing in FIG. 10 shows the structure of the marking equipment used for said laser beam marking.

With this equipment, illumination light emitted from a microscope light source 101 lights up workpiece 104 placed on a stage 103 through an objective lens 102 and reflected light from the workpiece is guided into image pickup equipment 105 consisting for example of a CCD camera installed to the body tube of the microscope to display the image on a monitor 106 so that the apex which represents the magnetic gap depth of the magnetic core of workpiece 104 may be observed and its position may be measured by means of an image processor (omitted from the drawing). The irradiation position of the laser beam being emitted from laser beam emitter 107 can be indicated for checking purposes on the monitor by the effect of the guide light being emitted from guide light source 108 located coaxially with the optical axis of the laser beam.

When applying a concave mark on a magnetic core using this equipment, the image of the magnetic gap area of the magnetic core is first displayed on the monitor by means of the optical microscope system to measure the apex position which represents the magnetic gap depth using the image processor, before making adjustment so that the apex position and the starting point of laser irradiation come to a prescribed correlation using the guide light as the reference light, thus accurately setting the mark position. Subsequently, a concave mark is subsequently formed at the prescribed position by irradiating, for example, a pulse oscillating YAG laser beam.

A characteristic feature of this laser beam marking equipment is that it is capable of measuring the apex distance with each of multiple magnetic cores aligned in the workpiece and of setting the marking position accordingly before providing the mark by laser beam. By use of a mask to prescribe the contour of the mark, it is also possible to apply a mark on the magnetic core by a single shot. Since the mark thus formed is a concave mark etched by laser beam on the side surface of the magnetic core, the existence/nonexistence of the mark on the processing surface and its dimensions etc., can be observed through an ordinary microscope midway during the machining of the air bearings from the machining direction, namely, the direction perpendicular to the air bearing.

(Embodiment 1)

To produce the magnetic core, a pair of C-shaped section and I-shaped section blocks made of monocrystal ferrite were prepared, the contact planes of which were mirror-finished before forming a gap spacer on the planes constituting the magnetic gap. Subsequently, the two blocks were joined together and molded using glass filler before slicing at prescribed intervals to complete the magnetic cores.

The multiple magnetic cores thus obtained were aligned and fixed in the marker jig (workpiece) and mounted to the laser beam marking equipment for application of a mark of prescribed shape and dimensions before performing step-machining to complete the magnetic cores for use with the floating-type composite magnetic head.

Figure 3:
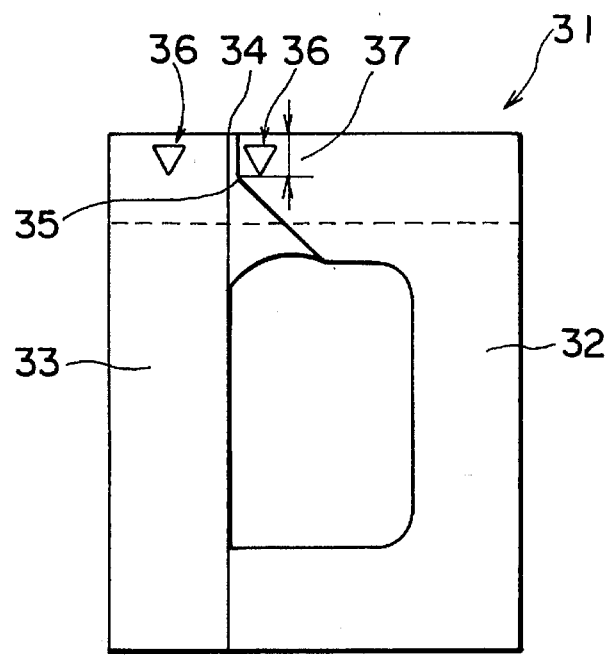
FIG. 3 shows a magnetic core provided with marks on its side surface.
Figure 4:
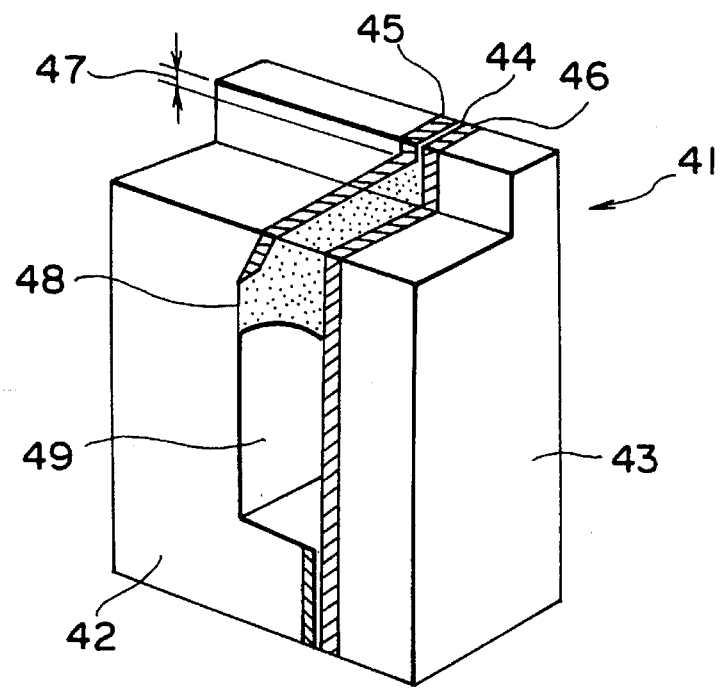
FIG. 4 is all inclined view of an example of a magnetic core for use with the floating-type composite magnetic head.
Figure 5:
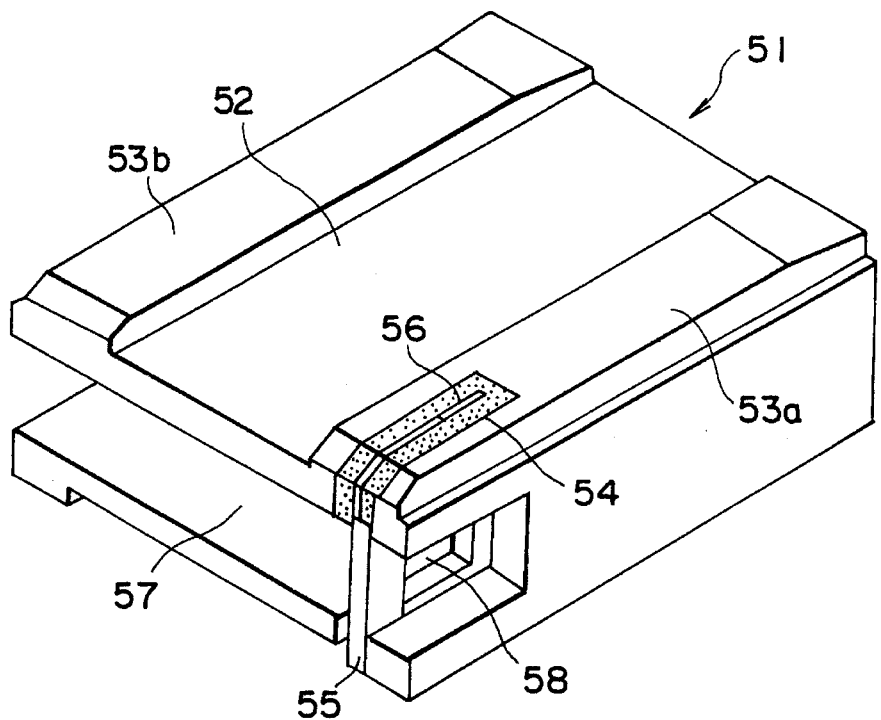
FIG. 5 is an inclined view of an example of a floating-type composite magnetic head.
Figure 6:
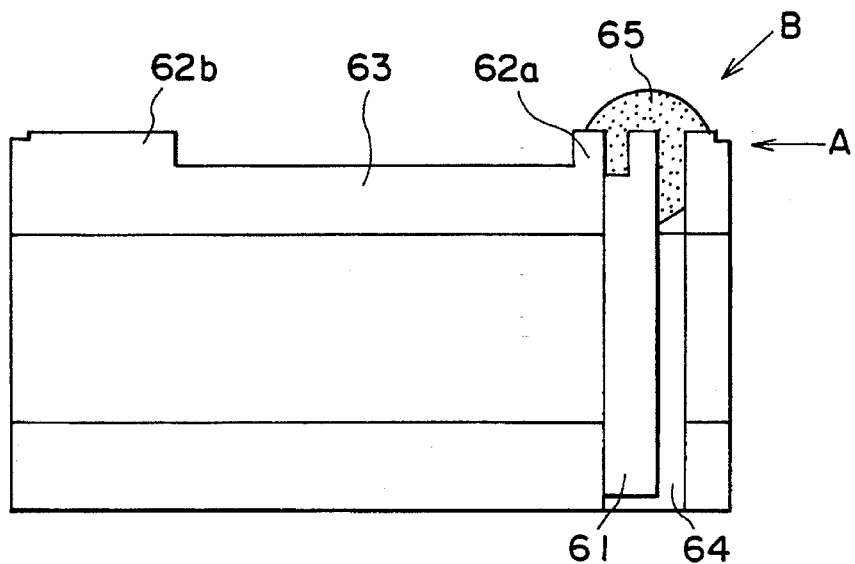
FIG. 6 is a drawing showing the status of a magnetic core molded inside the slit by glass filler.
Figure 7:
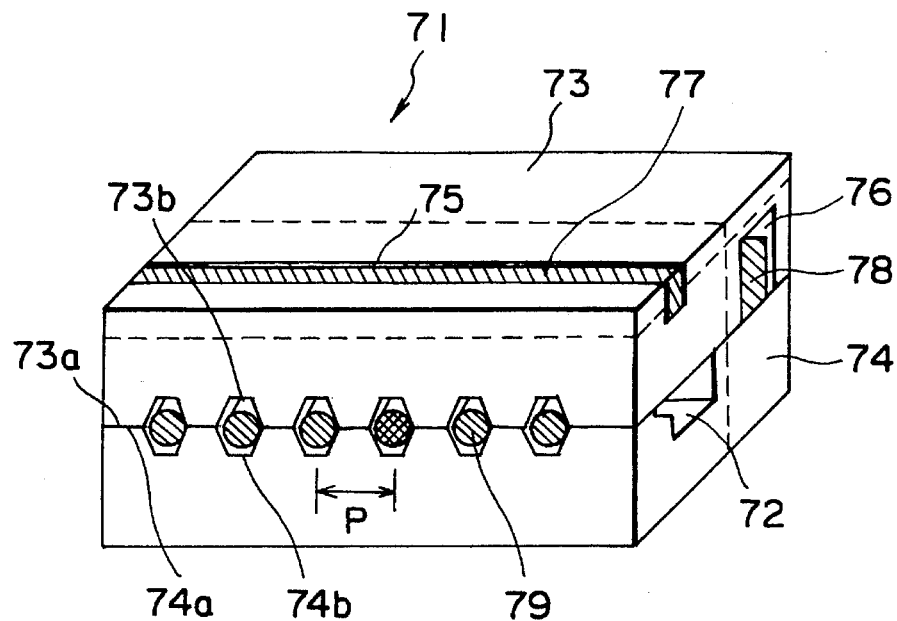
FIG. 7 is an inclined view indicating a block provided with the mark.
Figure 8:
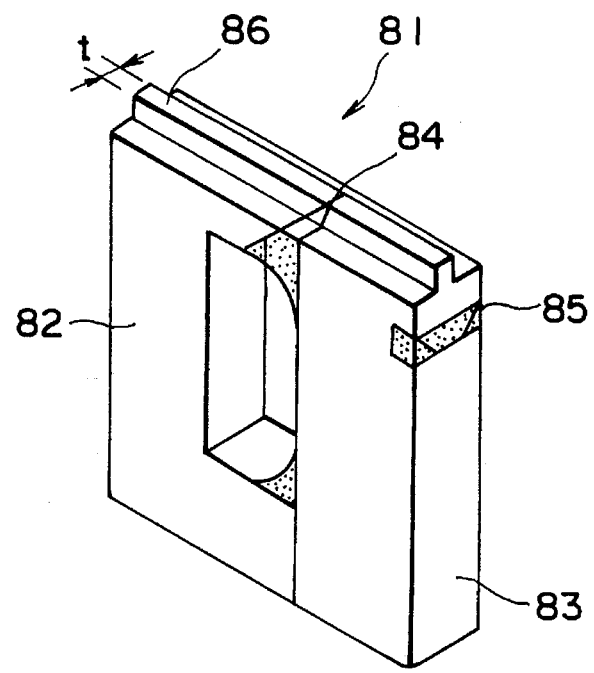
FIG. 8 is an inclined view indicating a conventional magnetic core provided with a mark machined on the exposed external side surface of the core.
Figure 9:
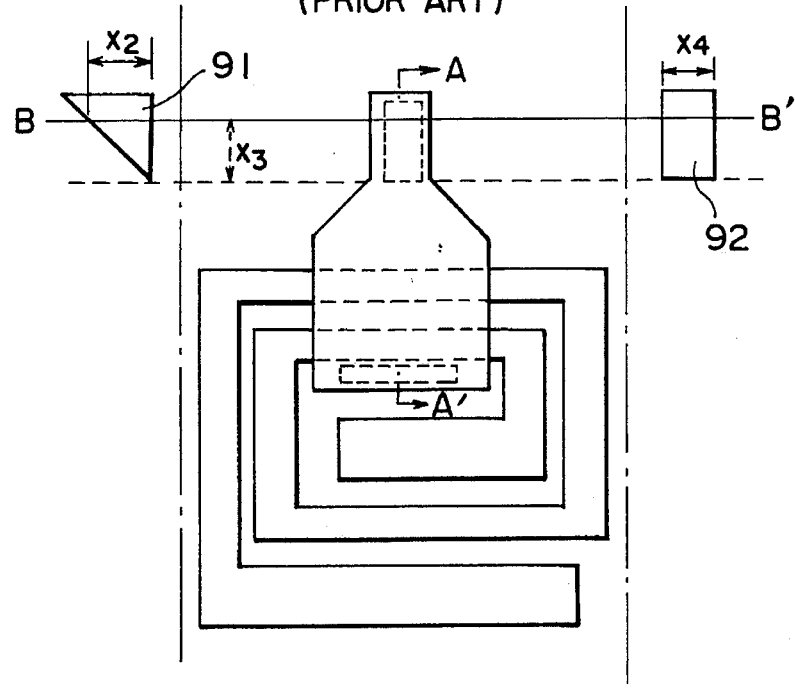
FIG. 9 is a drawing showing the positioning of measurement marks provided on a thin-film magnetic head.

FIG. 3 shows the structure of a magnetic core 31 thus produced wherein the C-shaped core 32 and I-shaped core 33 are cemented together by glass filler 38 and two marks 36 positioned to the prescribed correlation with the apex 35 are provided on both sides across the magnetic gap 34. These marks are of right-angled isosceles triangle shape in concave profile and the apex of these marks of the shape are positioned level with the apex point of the magnetic gap depth. The dimension of the two sides of the right-angled isosceles triangle is 6 um and the concave depth is 1 um, taking less than a second to form the marks by laser beam irradiation. The distance 37 represents the magnetic gap depth under such condition.

The magnetic core thus provided with concave marks is cemented inside the slit in the slider and excess glass is removed before finish-machining the air bearings to control the magnetic gap depth.

When performing finish-machining of the air bearings, multiple composite slider assemblies (CSA) adhered to a lapping jig are ground down to a prescribed depth such as, for example, the virtual magnetic gap depth (BGd)+20 um from the surface of the lapping jig. Subsequently, finishing to a level of BGd+5 um is performed using a lapping machine while checking the marks from above using a metallurgical microscope of a magnification of ×200 to ×400.

Figure 1A:
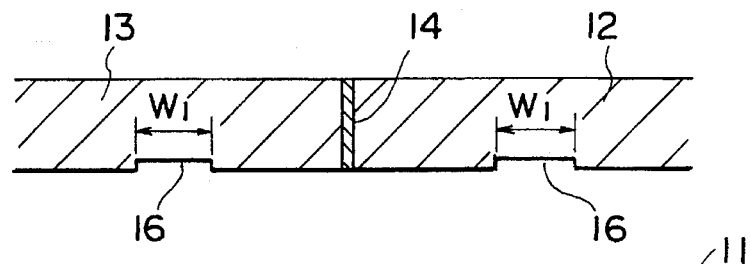
FIGS. 1(a) and (b) are respectively a cross-sectional view and a side elevational view indicating the relative positioning of concave marks and the apex.
Figure 1B:
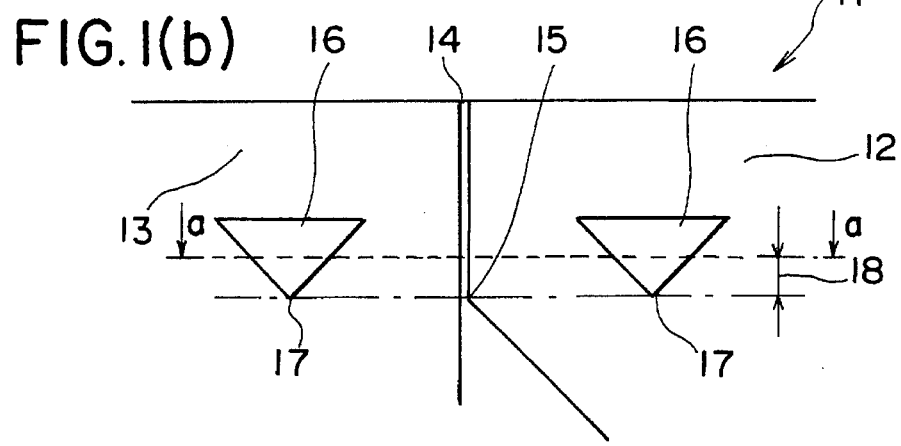

FIGS. 1(a) and (b) are explanatory drawings of the status of the marks thus provided wherein FIG 1(b) shows the side surface near the magnetic gap and FIG. 1(a) is a cross-sectional view taken along the dotted line a—a in FIG.1(b). As grinding of the cores 12 and 13 progresses, marks 16 which initially could not be seen from the air bearing side become visible as shown in FIG. 1(a) and the magnetic gap depth 18 can be determined by measuring the width $W_1$ of the marks. Therefore, these marks can be observed and checked as necessary during the succeeding process of polishing by lapping before concluding machining when prescribed conditions are obtained. By this method, the magnetic gap depth is controllable to a very high degree of precision and a floating-type composite magnetic head of a stable quality is obtainable.

In this embodiment, marks of a triangular shape were adopted but the shapes and dimensions of the mark and the positional correlation between the mark and the apex can of course be selected optionally.

(Embodiment 2)

Figure 2:
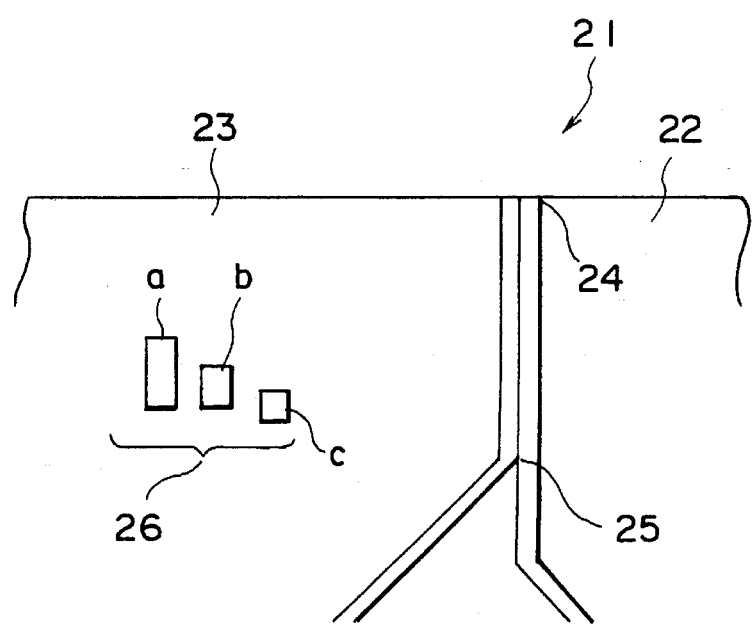
FIG. 2 is a drawing indicating the relative positioning of multiple concave marks and the apex.

High permeability magnetic films were applied to the magnetic head facing planes of both the blocks by the spattering method and the gap spacer was provided after that. Following almost the same procedure as with embodiment 1 for the rest of the processes, magnetic cores were produced and 3 marks as shown in FIG. 2 were applied to each of them.

These marks are to be provided with, for example, the following correlations. Mark "a" and mark "b" are positioned with a level difference in the upper ends of 2 um while the lower ends remain level. Mark "c" is lower at the upper end than mark "b" by 2 um and the level difference between its lower end and the lower ends of marks "a" and "b" is 1.5 um. The lower end of mark "b" is positioned at 3 um apart from the apex position.

Before finish-machining the air bearings, the distance between the upper ends of the magnetic cores (air bearing side of the slider) and the apex position remains at about 50 um. Therefore, rough machining can be performed until mark "b" appears at which time finish-machining should be adopted until mark "b" completely disappears, thus providing high-precision control of the magnetic gap depth.

Figure 11:
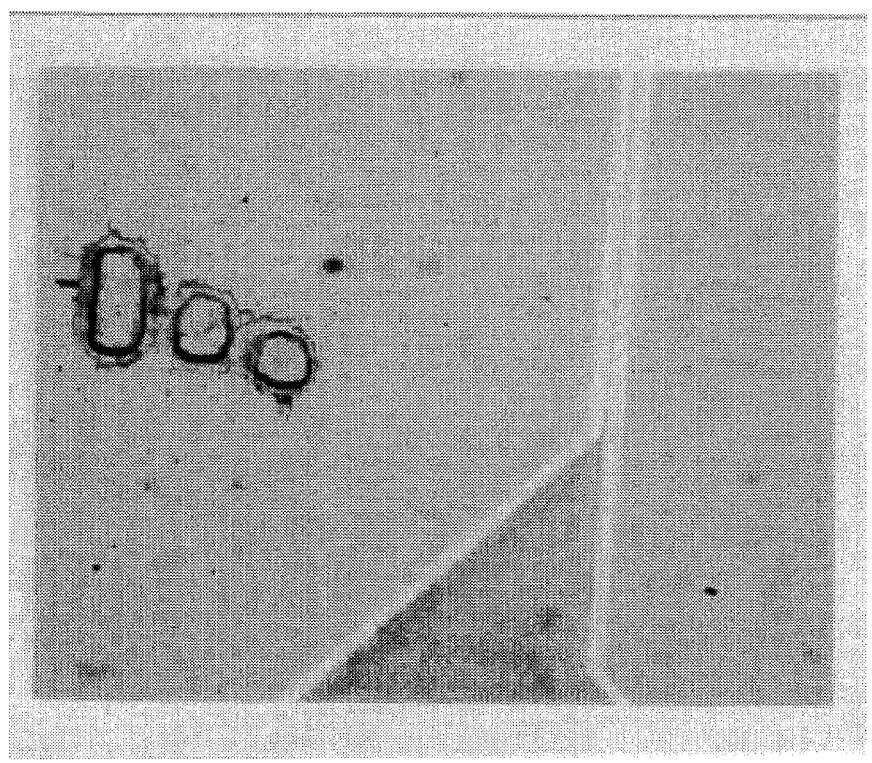
FIG. 11 is a photograph depicting the texture of the side surface of a ceramic magnetic core provided with marks.
Figure 12:
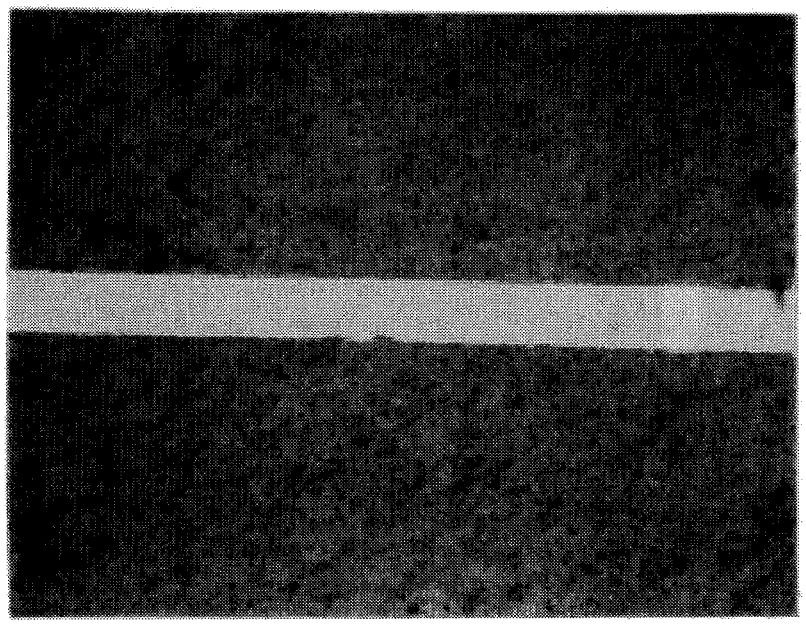
FIG. 12 is a photograph depicting the texture of the upper surface of a ceramic magnetic core provided with marks.

A metallurgical microscope should be used to check the concave marks periodically by observing the mark forming location near the gap between the magnetic cores from above the air bearing. FIG. 11 is a microscopic photograph of the applied marks and FIG. 12 is an observational photograph of the status of marks which appeared on the disc facing plane of the magnetic core during machining.

Different from embodiment 1, this embodiment features the advantage that the magnetic gap depth can be determined by observing the number of marking patterns appearing at prescribed distances from the magnetic gap instead of measuring the size (dimension) of the mark appearing on the air bearing side.

In this embodiment, an example involving the use of 3 marks was described, but the number, shapes and correlations of the marks can be optionally selected depending on required magnetic gap dimensions and precision, in an embodiment of this invention.

With this invention, since the marks provided on the side surface of the magnetic core can be directly measured from the direction perpendicular to the air bearing, the influence of the refractive index of glass is minimal and since there is no fear of interference between the objective lens of the eyepiece and the magnetic head, measurement under a higher magnification is available thus enabling high-precision control of the magnetic gap depth. Furthermore, the influence of possible inclination of the magnetic core cemented inside the slit is also minimal.

Embodiments of this invention shall not be limited to those exemplified in the above, but various variations can be available within the range of the claims.

What we claim is:

1. A method for controlling finish grinding of an air bearing surface of a floating type composite head for use in connection with a flat magnetic storage medium so as to provide an accurate magnetic gap depth, said composite head including a slider having internal walls therein presenting a slit opening at said air bearing surface and extending into said slider and a magnetic core held in said slit by bonding glass, said core having an active surface at said air bearing surface of the slider, a side surface extending away from said active surface within said slit and disposed in face-to-face contact with an internal wall of said slider and a magnetic gap terminus spaced from said active surface, said method comprising:

providing one or more shaped concavities in said side surface prior to said finish grinding, each said concavity being disposed at a known position relative to said terminus;

simultaneously finish grinding said air bearing surface and said active surface; and observing the appearance or shape of one or more of said concavities at said active surface during said finish grinding to thereby determine the depth of said terminus in said slit.

2. A method as set forth in claim 1, wherein said side surface is perpendicular to said active surface.

3. A method as set forth in claim 1, wherein a plurality of said concavities are provided, there being a respective concavity positioned on each side of an imaginary straight line extending from said active surface to said terminus.

4. A method as set forth in claim 2, wherein a plurality of said concavities are provided, there being a respective concavity positioned on each side of an imaginary straight line extending from said active surface to said terminus.

5. A method as set forth in claim 1, wherein a plurality of said concavities are provided, there being one concavity positioned closer to said air bearing surface than a second concavity.

6. A method as set forth in claim 2, wherein a plurality of said concavities are provided, there being one concavity positioned closer to said air bearing surface than a second concavity.

* * * * *

UNITED STATES PATENT AND TRADEMARK OFFICE
CERTIFICATE OF CORRECTION

PATENT NO. : 5,481,791
DATED : January 9, 1996
INVENTOR(S) : Toshinori Matsubara et al.

It is certified that error appears in the above-indentified patent and that said Letters Patent is hereby corrected as shown below:

Column 1, line 56, delete "off" and substitute --of--.
Column 3, line 15, delete "74$b$ . . ." and substitute --74$b$, . . .--.

Signed and Sealed this

Twenty-eighth Day of May, 1996

*Attest:*

BRUCE LEHMAN

*Attesting Officer*     *Commissioner of Patents and Trademarks*